(12) United States Patent
Pham et al.

(10) Patent No.: US 9,106,381 B2
(45) Date of Patent: Aug. 11, 2015

(54) METHOD AND SYSTEM CONFIGURING A BASE STATION TO TRIGGER HS-DPCCH GENERATION

(71) Applicant: ALCATEL LUCENT, Paris (FR)

(72) Inventors: Huy Thang Pham, Dollard-des-Ormeaux (CA); Nicola Puddle, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 122 days.

(21) Appl. No.: 14/037,996

(22) Filed: Sep. 26, 2013

(65) Prior Publication Data

US 2015/0085758 A1  Mar. 26, 2015

(51) Int. Cl.
 *H04L 5/00* (2006.01)
(52) U.S. Cl.
 CPC ............ *H04L 5/0053* (2013.01); *H04L 5/0078* (2013.01)
(58) Field of Classification Search
 CPC .............................. H04L 5/0053; H04L 5/0078
 USPC .................................................. 370/329, 252
 See application file for complete search history.

(56) References Cited

U.S. PATENT DOCUMENTS

| 8,761,068 B2* | 6/2014 | Mohan et al. ................ 370/311 |
| 8,867,438 B2* | 10/2014 | Kim et al. ..................... 370/328 |
| 2015/0003376 A1* | 1/2015 | Pang et al. .................... 370/329 |

OTHER PUBLICATIONS

Qualcomm, Physical Channels and Procedures to Support Standalone HS-DPCCH in CELL_FACH, Aug. 2011.*
PCT/ISA/206 Partial International Search from corresponding PCT/USIB2014/002206, dated Apr. 7 2015, total pp. 6.
Alcatel-Lucent, "Standalone HS-DPCCH", 3GPP R3-131639, vol. RAN WG3, Venice, Italy, Oct. 2013, total pp. 2.
Alcatel-Lucent, "RAN3 impacts on Standalone HS-DPCCH", Rc-120566, San Jose del Cabo, Mexico Mar. 2012, total pp. 2.
Alcatel-Lucent, Standalone HS-DPCCH, repetition of HS-SCCH order, R3-132124, San Francisco, CA, Nov. 2013, total pp. 2.
NSN, "Consideration on Standalone HS-DPCCH enhancement", R3-140195, Prague, Czech Republic, Feb. 2014, total pp. 2.

* cited by examiner

*Primary Examiner* — Rasheed Gidado
(74) *Attorney, Agent, or Firm* — Wall & Tong, LLP

(57) ABSTRACT

Systems, methods, apparatus for configuring NodeB triggering of HS-DPCCH within a UMTS system.

24 Claims, 7 Drawing Sheets

METHOD AND SYSTEM CONFIGURING A BASE STATION TO TRIGGER HS-DPCCH GENERATION

FIELD OF THE INVENTION

The invention relates generally to managing network resources such as in a wireless network and, more specifically but not exclusively, adapting an update function associated with a mobile services database.

BACKGROUND

In the Universal Mobile Telecommunications System (UMTS) system, User Equipment (UE) and NodeBs (NBs) or base stations (BSs) communicate via a plurality of physical and logical channels. An Uplink High Speed-Dedicated Physical Control Channel (HS-DPCCH) carries to the NodeB acknowledgment information and current channel quality indicator (CQI) of the UE. This value is then used by the NodeB to calculate how much data to send to the UE during the next transmission, such as via a High-Speed Downlink Shared Channel (HS-DSCH) or other channel. The HS-DSCH is a transport channel shared among multiple users as a radio access bearer, and can be mapped onto one or several physical channels (also known as codes) according to a spreading factor.

In the UMTS system, a "standalone HS-DPCCH without ongoing E-DCH (Enhanced Dedicated Channel) transmission" capability has been added as a sub-feature of UMTS Release-11 "Further Enhancements for CELL_FACH" feature. This "standalone HS-DPCCH transmission" allows the UE to provide channel quality information (CQI) and downlink ACK/NACK information to improve the HS-DSCH transmission in CELL_FACH state without the presence of uplink traffic (in contrast to a UMTS Rel-8 solution where HS-DPCCH is opportunistically used in response to the UE's acquisition of common E-DCH to send uplink traffic).

This "HS-DPCCH without ongoing E-DCH transmission" is triggered at the UE by an HS-SCCH order from the NodeB prior to UE downlink HS-DSCH transmission. There is no ACK function in the uplink in response to the HS-SCCH order triggering the standalone HS-DPCCH, and as per 3GPP specification (25.308-11.5.0, section 23.1): "upon reception of an HS-SCCH order for HS-DPCCH without ongoing E-DCH transmission, if random access procedure fails and there is no uplink data in the UE buffer, the UE does not re-initiate the random access procedure unless another HS-SCCH order is received."

When the HS-SCCH order fails to generate the common E-DCH acquisition (and by extension, the acquisition of HS-DPCCH) by the UE, the NodeB currently does not know the optimum time to resend the HS-SCCH order and whether to (a) continue the resending of HS-SCCH order until expiry of a Discard Timer (25.433, 9.2.1.24E) which operates to clear the HS-DSCH data queue; or (b) stop resending of HS-SCCH order and proceed with blind HS-DSCH transmission as in Rel-8. If approach (b) is taken, then the HS-DSCH transmission is not optimum because there's no DL ACK/NACK feedback until the UE acquires the common E-DCH to send RLC ACK in response to the downlink data.

One possible solution is for the NodeB to perform blind repetition of HS-SCCH order until HS-DPCCH acquisition is complete.

Unfortunately, to ensure reliability of HS-SCCH, high power has to be used and this would inject interference in the downlink, in addition to the waste of (HS-SCCH) code resource. Too short a blind repetition period would increase the interference and code waste, while too long a blind repetition period would add latency. In addition, since the NodeB does not have deep knowledge of individual UE QoS policies, it would need to treat all UEs the same (e.g. either all UEs would have the HS-SCCH order blindly repeated a finite number of times before blind HS-DSCH transmission would occur, or all UEs would have the HS-SCCH order blindly repeated indefinitely until traffic is discarded in the NodeB queue due to a discard timer).

BRIEF SUMMARY

Various deficiencies of the prior art are addressed by the present invention of systems, methods, apparatus and the like providing a mechanism to avoid NodeB/BS operational ambiguity by configuring NodeB/BS to trigger a standalone HS-DPCCH (High Speed-Dedicated Physical Control Channel) without ongoing E-DCH (Enhanced Dedicated Channel) transmission within a Universal Mobile Telecommunications System (UMTS) system.

A method according to one embodiment for configuring NodeB triggering of standalone HS-DPCCH comprises determining for the NodeB a first parameter (RepPeriod) value indicative of a time period within which the NodeB will repeatedly transmit toward a UE a HS-SCCH order adapted to trigger a standalone HS-DPCCH at the UE; determining for the NodeB a second parameter (MaxRepetition) value indicative of a number of times the HS-SCCH order will be transmitted to the UE before the NodeB initiates a downlink blind transmission when the UE has no uplink data to transmit; and transmitting toward the NodeB the determined first and second parameter values to adapt thereby the operation of the NodeB responsive to a standalone HS-DPCCH without ongoing E-DCH transmission.

Generally speaking, various embodiments operate to provide NodeB configuration policies pertaining to the triggering of standalone HS-DPCCH, which configurations or policies, where the configuration policies a be applied to one or more NodeBs individually or as a group, and further applied according to various triggering classes such as defined in terms of UE related attributes, network conditions and/or management requirements, such as defined by service level agreements (SLA), service provider, UE device capability, type of mobile service, type of traffic, priority of traffic, priority of traffic channel, Random Access Channel (RACH) parameters for enhanced uplink, network operator requirements and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of a method, system and apparatus in which a UMTS base station (NodeB or NB) is configured by a RNC or other entity to repeatedly transmit HS-SCCH orders to a UE for a predetermined amount of time or number of transmissions to trigger at the UE the generation of a common E-DCH acquisition (and by extension, the acquisition of HS-DPCCH). Various modifications and alternative embodiments are also described.

Figure 1:
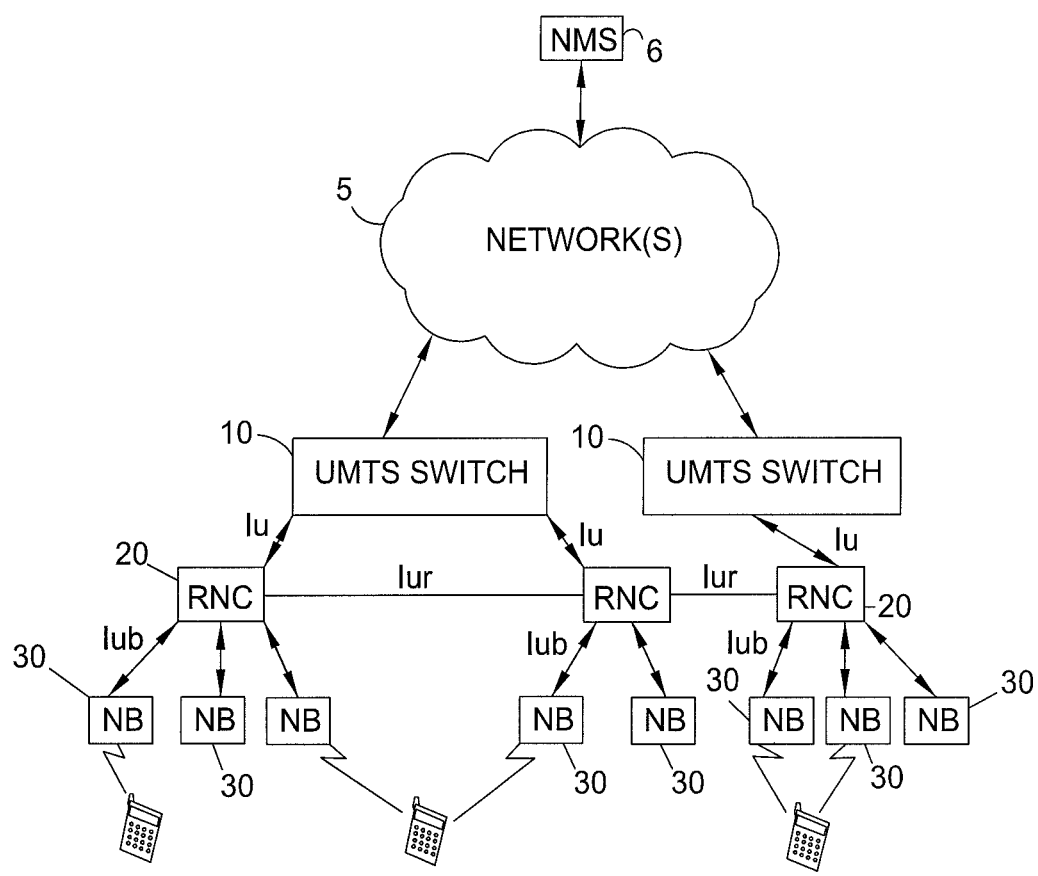
FIG. 1 depicts a high level block diagram of a network benefiting from various embodiments.

FIG. 1 depicts a high level block diagram of a network benefiting from various embodiments. Specifically, FIG. 1 depicts a 3GPP (3rd Generation Partnership Project) Universal Mobile Telecommunication System (UMTS) mobile network 100 generally operating in a Frequency Division Duplex (FDD) mode.

Specifically, FIG. 1 depicts a plurality of UMTS mobile service switches 10 belonging to a Core Network (CN). Each of the mobile service switches 10 is linked to one or more networks 5 and, by means of a Iub interface, to one or more Radio Network Controllers (RNC) 20. Each RNC 20 is linked to one or more Base Stations (NB) 30 by means of a Iub interface. The Base Stations (NB) 30, which are distributed over a network coverage area, can communicate by radio with mobile terminals 40, illustratively User Equipment (UE) 40-1, 40-2 and 40-3. Some RNCs 20, such as those operating as Drift RNCs (DRNCs) and Service RNCs (SRNCs), can additionally communicate with each other by means of a Iub interface. Various network management functions may be provided by, illustratively, a network management system (NMS) 6 operatively coupled to the various networks elements and subelements discussed herein.

Each of the mobile service switches 10, RNCs 20, NBs 30 and UEs 40 includes various radio devices, switching technologies, input-output technologies, controller/computer hardware and software and the like to implement appropriate communications and control functionality as is known. Such functionalities include, illustratively, packet buffering, packet routing, radio communications, message handling, and so on; generally speaking, the various control plane and data plane functions enable communication within the context of a UMTS mobile network.

The various control plane and data plane functions are described in more detail in the various technical specifications (TS) of the 3rd Generation Partnership Project (3GPP), such as the Iu interface specifications TS 25.410-25.415; Iub interface specifications TS 25.430-25.435; Iub/Iur interface specification TS 25.427; Iur interface specification TS 25.420-25.425; RRC specification TS 25.331; HSDPA specification TS 25.308; E-DCH (HSUPA) specification TS 25.319, and Medium Access Control (MAC) protocol specification TS 25.321, which technical specifications are incorporated herein by reference in their entireties. Moreover, hardware and/or software such as discussed below with respect to the various figures may be used within the context of the mobile service switches 10, RNCs 20, NBs 30 and UEs 40, as well as within the context of a standalone policy configuration manager (not shown), such as described below with respect to FIG. 4.

Of particular interest within the context of the present embodiments is the 3rd Generation Partnership Project (3GPP) Technical Standard (TS) 25.308, High Speed Downlink Packet Access (HSDPA); Overall description, version 11.0.0 published in September 2012 by the 3GPP and incorporated herein by reference in its entirety.

As previously noted, an "HS-DPCCH without ongoing E-DCH transmission" is triggered at the UE by an HS-SCCH order transmitted to the UE from a NodeB. The HS-DPCCH transmitted by the UE carries to the NodeB acknowledgment information and current channel quality indicator (CQI) associated with the UE. In various embodiments, the CQI is used by the NodeB to calculate how much data to send to the UE during the next transmission, such as via a High-Speed Downlink Shared Channel (HS-DSCH) or other channel. In various embodiments, the Hybrid Automatic Request (HARQ) ACK/NACK feedback helps increase the channel reliability and throughput via well-known soft combining mechanisms, such as Incremental Redundancy (IR) and the like. Generally speaking, without the CQI/ACK/NACK information carried by the HS-DPCCH, the HS-DSCH data transfer performance is reduced.

There is no ACK function in the uplink by the UE in response to receiving the HS-SCCH order, and as per 3GPP specification (25.308-11.5.0, section 23.1): "upon reception of an HS-SCCH order for HS-DPCCH without ongoing E-DCH transmission, if random access procedure fails and there is no uplink data in the UE buffer, the UE does not re-initiate the random access procedure unless another HS-SCCH order is received."

Various embodiments provide a mechanism whereby one or more NodeB elements are configured to respond to a missing "HS-DPCCH without ongoing E-DCH transmission" in a manner consistent with various network management or operational goals. Generally speaking, the various embodiments are directed to optimizing resource usage (code, power etc.) and quality of service (QoS) handling related to this situation.

In various embodiments, NodeB elements are configured to repeat transmission of the HS-SCCH order to the UE until HS-DPCCH acquisition is complete. Repeating transmission of the HS-SCCH order may be constrained according to a maximum time period within which retransmission of the HS-SCCH order will occur, a maximum number of retransmissions of the HS-SCCH order and so on. If the NodeB does not receive the HS-DPCCH within the maximum time period or before the maximum number of retransmissions then the NodeB will send data to the UE at, illustratively, a reduced data rate or via blind HS-DSCH transmission.

NodeB elements may be configured by a RNC (or other network element). Depending on different UE profiles and traffic characteristics, the RNC may configure NodeB elements to operate differently in response to different UE/traffic characteristics.

Figure 2:
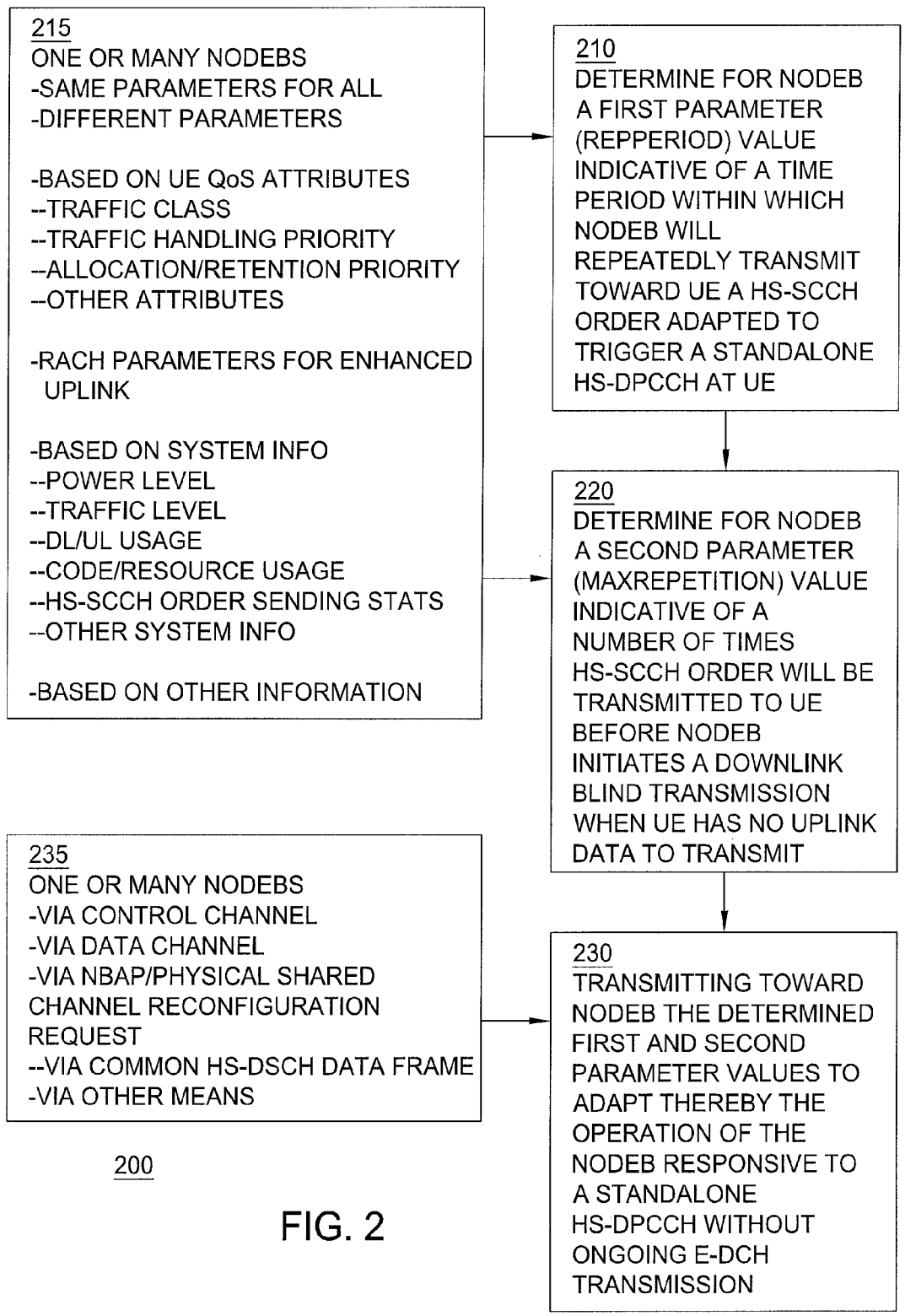
FIG. 2 depicts a flow diagram of methods according to various embodiments.

FIG. 2 depicts a flow diagram of a method according to one embodiment. Specifically, the method 200 provides a mechanism for determining various parameter values associated with a HS-DPCCH trigger policy and propagating the determined values toward one or more NodeBs or BSs. In this manner, the one or more NodeBs or BSs have policies configured to trigger a standalone HS-DPCCH (High Speed-Dedicated Physical Control Channel) without ongoing E-DCH (Enhanced Dedicated Channel) transmission within a Universal Mobile Telecommunications System (UMTS) system.

The method 200 of FIG. 2 may be performed within the context of an RNC (e.g., RNC 20 of FIG. 1), a stand-alone policy configuration manager (e.g., policy configuration manager 410 of FIG. 4), or some other network element in communication with the one or more NodeBs or BSs.

At step 210, the method 200 determines for the NodeB a first parameter (RepPeriod) value indicative of a time period within which the NodeB will repeatedly transmit toward a UE a HS-SCCH order adapted to trigger a standalone HS-DPCCH transmission by the UE. RepPeriod can be infinity (i.e., repeat transmission until expiry of a Discard Timer, at which time data is removed from the NodeB HS-DSCH priority queue) or some finite amount of time.

At step 220, the method 200 determines for the NodeB a second parameter (MaxRepetition) value indicative of a maximum number of times the HS-SCCH order will be transmitted to the UE before the NodeB initiates a downlink blind transmission when the UE has no uplink data to transmit. MaxRepetition can be infinity (i.e., repeat transmission until expiry of a Discard Timer, at which time data is removed from the NodeB HS-DSCH priority queue) or some finite number.

Referring to box 215, the parameter values determined or selected at steps 210 (RepPeriod) and 220 (MaxRepetition) result in desired NodeB operation, which operation may be adapted by selecting various parameters or parameter values. Parameter value determinations or selections may be made on behalf of one or many NodeBs, using the same parameter value determinations/selections for some or all of the NodeBs, using different parameter value determinations/selections for some or all of the NodeBs and so on. The parameter value determinations/selections may be based on UE QoS attributes, Random Access Channel (RACH) parameters for enhanced uplink, static or dynamic system information and/or other information as described herein with respect to the various figures. Thus, a desired operation of a NodeB may be implemented by appropriate parameter value determinations/selections.

A Common HS-DSCH Priority Queue (see, e.g., NBAP, 9.2.1.117) contains two information portions; namely, a Common (Hs-DSCH) Mac Flow Priority Queue (having a typical range of 0 through 7) and a Scheduling Priority Indicator (e.g., a cmch-pi, having a typical range of 0 through 15). In various embodiments, the parameters RepPeriod and MaxRepetition may be associated with either of these information portions. When associated with the first information portion, the NBAP may be used. When associated with the second information portion, then either of the NBAP or FP may be used.

UE QoS attributes may comprise, illustratively, traffic class attributes, traffic handling priority attributes, allocation/retention priority attributes and/or other UE QoS attributes.

System information may comprise, illustratively, power level information, traffic level/congestion information, DL/UL usage information, code/resource usage information, HS-SCCH order sending statistics and/or other static or dynamic system information.

At step 230, the method 200 transmits toward the NodeB (or multiple Nodes) the determinations/selections first and second parameter values, along with any other configure information, to adapt thereby the operation of the NodeB trigger a standalone HS-DPCCH without ongoing E-DCH transmission. Referring to box 235, transmission(s) may be via a control channel, via a data channel, via a NodeB application part (NBAP) control plane protocol (e.g., NBAP/Physical Shared Channel Reconfiguration Request), via a NBAP frame protocol, via common HS-DSCH Frame Protocol or via some other means.

Calculating NodeB Configuration Parameters

In various embodiments, the RNC (or other entity) may estimate a maximum acquisition time according to the following equation:

$$\text{RepPeriod} = M\text{max} * Nb01\text{max} + \text{margin} \quad (\text{eq. 1})$$

Where:

"Mmax" is a maximum number of preamble cycles, such as defined in 3GPP TS 25.331, 10.3.6.67;

"Nb01max" is an upper bound for random backoff when a NACK to Acquisition Indicator Channel (AICH) is received, such as defined in 3GPP TS 25.331 and TS 25.321, 11.2.2A; and "Margin" is an amount associated with propagation delay and UE processing time. Margin may be used to adapt for various factors such as propagation delay, UE processing time, T2 timer between each preamble transmission attempt and the like.

Various embodiments calculate or otherwise adapt the parameters in response to, illustratively, service level agreement (SLA) such as UE Olympic Level of Service (OLS) (Gold, Silver, Bronze) and/or traffic type (Interactive, Background). The RNC calculation may be adapted to configure the NodeB policy to be more aggressive or conservative.

For example, a Gold Interactive user may have RepPeriod configured to Mmax*Nb01min while a Bronze Background may have RepPeriod configured to Mmax*Nb01max, where Nb01min is the lower bound for random backoff timer when a NACK to AICH is received, illustratively such as defined in 3GPP TS 25.331, 10.3.6.67. Various different and other values may be determinations/selected in accordance with a desired level of aggressive or conservative NodeB policy, which desired level is based upon the various UE attributes, system information and so on discussed herein such as with respect to box 215 of the method 200 of FIG. 2.

Various embodiments improve differentiation or granularity in terms of desired NodeB configuration. For example, assuming that a number of unique priority queues is limited (e.g., 8), by providing information on the Common HS-DSCH FP, the RNC can associate determined or selected or calculated parameters on a per individual UE and/or per Common Transport Channel Priority Indicator (e.g., 16 priorities) basis. In addition, given that multiple logical channels can map to the same Cmch-PI, various embodiments provide an even finer granularity in terms of desired NodeB configuration by associating determined/selected/calculated parameters to individual {UE, LogicalChannel} pairs. In some embodiments, a policy to configure NodeB operation with respect to HS-SCCH order using determined/selected/calculated parameters is only applicable to the data contained in the Frame Protocol in question.

Figure 3A:
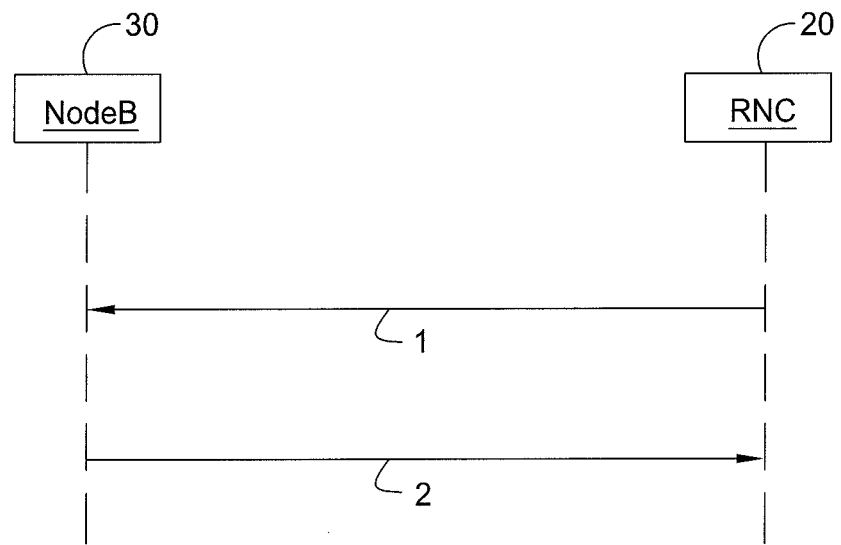
FIGS. 3A-3D depict simplified protocol diagrams according to various embodiments.

FIG. 3A depicts a simplified protocol diagram according to an embodiment; namely, a mechanism for configuring NodeB HS-SCCH Order Sending Policy. An RNC 20 computes RepPeriod and MaxRepetition parameter values and transmits the parameter values to a NodeB 30 via the NBAP protocol. In various embodiments, the RNC 20 and NodeB 30 interact as follows:

A first transmission (1) from the RNC 20 to the NodeB 30 comprises, illustratively, a NBAP/Physical Shared Channel Reconfiguration Request (Common E-DCH Information>NodeB Triggered HS-DPCCH Transmission Information>{RepPeriod and MaxRepetition}).

A second transmission (2) from the NodeB 30 to the RNC 20 comprises, illustratively, a NBAP/Physical Shared Channel Reconfiguration Response ( ). The second transmission, which operates as an acknowledgment (ACK) by the NodeB 30 of successful reception of the computed parameter values, is depicted as a NULL transmission or generic transmission, although other transmissions or transmission formats may be used for this purpose.

Figure 3B:
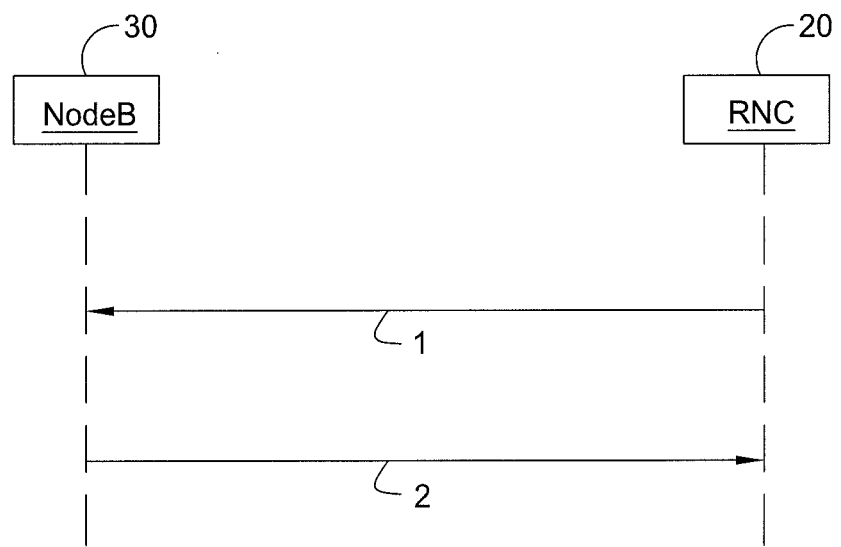

FIG. 3B depicts a simplified protocol diagram according to an embodiment; namely, a mechanism for configuring NodeB HS-SCCH Order Sending Policy in accordance with a HS-DSCH Priority Queue. That is, the RepPeriod and MaxRepetition parameters are configured per HS-DSCH priority queue. The RNC 20 transmits the parameter values to a NodeB 30 via the NBAP protocol (e.g., per 3GPP TS 25.433). In various embodiments, the RNC 20 and NodeB 30 interact as follows:

A first transmission (1) from the RNC 20 to the NodeB 30 comprises, illustratively, a NBAP/Physical Shared Channel Reconfiguration Request (HS-DSCH Common System Information>Common MAC Flow Priority Queue Information>Standalone Hs-dpcch>{RepPeriod and MaxRepetition}).

A second transmission (2) from the NodeB 30 to the RNC 20 comprises, illustratively, a NBAP/Physical Shared Channel Reconfiguration Response). The second transmission, which operates as an acknowledgment (ACK) by the NodeB 30 of successful reception of the computed parameter values, is depicted as a NULL transmission, though other transmissions may be employed for this purpose.

Figure 3C:

FIG. 3C depicts a simplified protocol diagram according to an embodiment; namely, a mechanism for configuring NodeB HS-SCCH Order Sending Policy in accordance with a {UE, Common Transport Channel Priority Indicator}. That is, the RepPeriod and MaxRepetition parameters are configured per HS-DSCH frame protocol. The RNC 20 transmits the parameter values to a NodeB 30 via Common HS-DSCH Frame Protocol (FP) (e.g., per 3GPP TS 25.435). In various embodiments, the RNC 20 and NodeB 30 interact as follows:

A first transmission (1) from the RNC 20 to the NodeB 30 comprises, illustratively, a HS-DSCH Frame Protocol as per TS 25.435 (Common HS-DSCH Data Frame(H-RNTI, CmchPI, . . . {RepPeriod and MaxRepetition}, payload).

There is no ACK transmission from the NodeB 30.

Figure 3D:
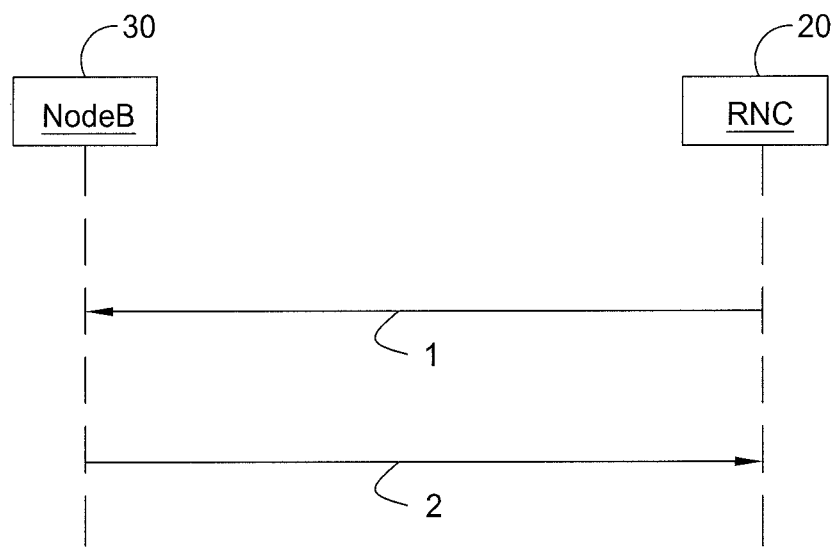

FIG. 3D depicts a simplified protocol diagram according to an embodiment; namely, a mechanism for configuring NodeB HS-SCCH Order Sending Policy in accordance with Random Access Channel (RACH) access parameters for enhanced uplink. That is, the RepPeriod and MaxRepetition parameters are configured per individual RACH access parameters for enhanced uplink as desired. In various embodiments, the RNC 20 and NodeB 30 interact as follows:

A first transmission (1) from the RNC 20 to the NodeB 30 comprises, illustratively, a NBAP/Physical Shared Channel Reconfiguration Request (Common E-DCH Information>NodeB Triggered HS-DPCCH Transmission Information>{ . . . Mmax, Nb01min, Nb01max . . . }).

A second transmission (2) from the NodeB 30 to the RNC 20 comprises, illustratively, a NBAP/Physical Shared Channel Reconfiguration Request ( ). The second transmission, which operates as an acknowledgment (ACK) by the NodeB 30 of successful reception of the computed parameter values, is depicted as a NULL transmission, though other transmissions may be employed for this purpose.

In this embodiment, the RNC 20 passes the parameters Mmax, Nb01min, Nb01max directly to the NodeB via a NBAP protocol. The NodeB can then combine these parameters with the common HSPA resource usage to optimize the determined/calculated/selected RepPeriod parameter. For example, if downlink power is underutilized, the NodeB would now have the discretion to have a more aggressive RepPeriod. Similarly, if the NodeB doesn't detect any common E-DCH acquisition attempt after Nb01max, it may conclude that the HS-SCCH order has been lost and can repeat the sending immediately rather than waiting for the full Mmax attempt.

Further to these and other embodiments, the RNC can pass extra parameters such as UE OLS (Gold, Silver, Bronze), or any extra parameter (whether already defined or not yet defined in 3GPP) to the NodeB to help with the RepPeriod and MaxRepetition determination.

Figure 4:
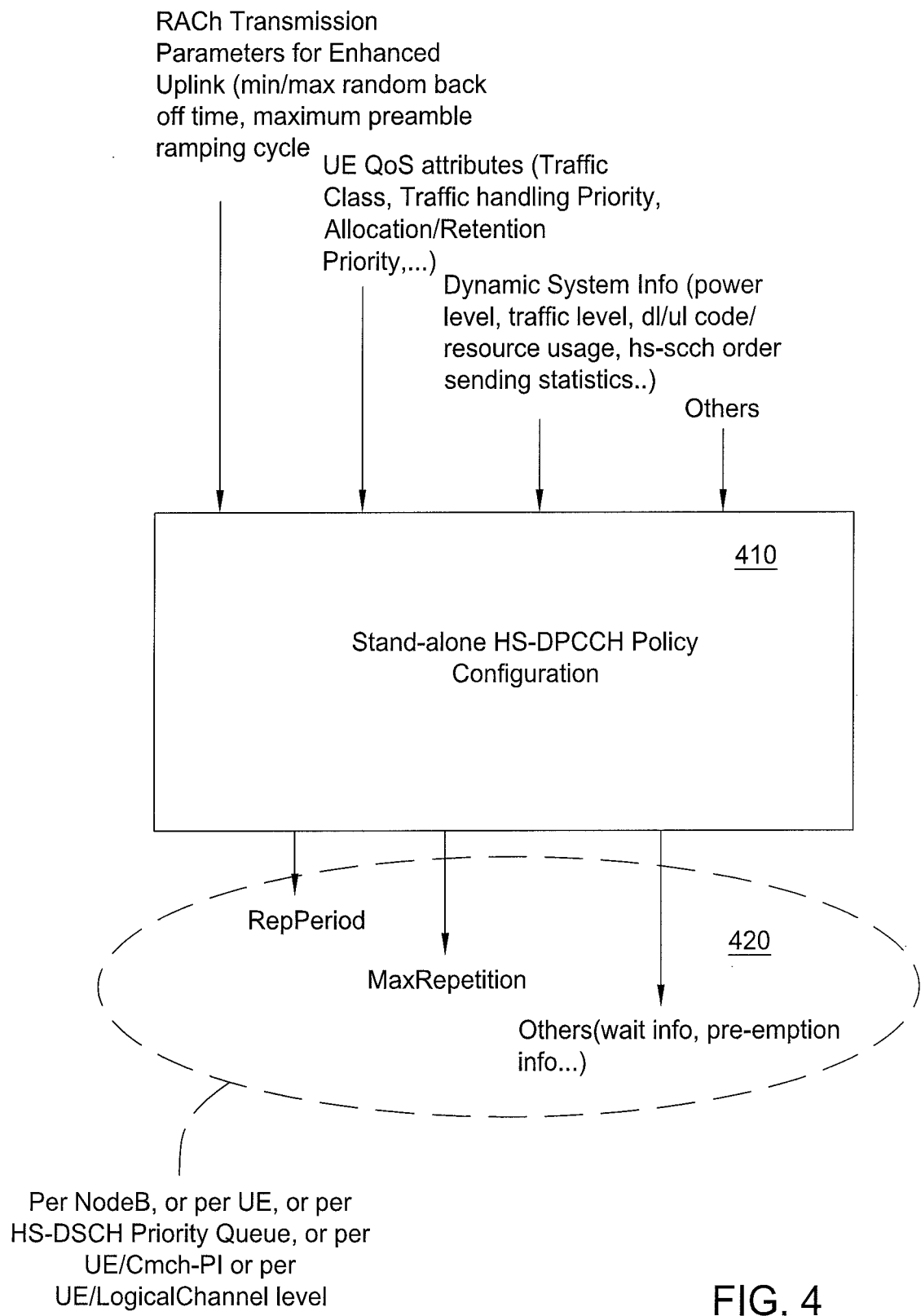
FIG. 4 graphically depicts a policy configuration manager operating according to various embodiments.

FIG. 4 graphically depicts a stand-alone HS-DPCCH policy configuration manager according to various embodiments. In particular, a policy configuration manager 410 receives information from multiple sources useful in determining parameters and parameter values used for policy configuration of an NodeB.

The various embodiments discussed herein with respect to FIG. 4 are used to adapt any of the other embodiments discussed herein with respect to the various figures.

The policy configuration manager 410 is depicted as receiving RACH transmission parameters for enhanced uplink, UE QoS attributes, system information and other information.

UE QoS attributes may comprise, illustratively, Traffic Class, Traffic Handling Priority, Allocation Retention Priority (ARP) such as per 3GPP TS 25.413 (Iu RANAP). These UE QoS attributes are generally available to the RNC, and generally not available to the NodeB. The UE class denoted as Gold/Silver/Bronze may be derived from, illustratively, 3GPP TS 25.413 RAB Attributes "Allocation Retention Priority".

System information may comprise, illustratively, dynamic information such as current UE power level, dl/ul code usage, code usage, resource usage and "HS-SCCH order sending statistics" that can be provided by the NodeB to help with, illustratively, the "RNC configuration of individual UE/logical channel" use case.

"HS-SCCH Order Sending Statistics" generally comprise a metric wherein a NodeB stores data indicative of how often an HS-SCCH order has to be sent to be successful. Statistical data such as maximum, mean, average and the like may be obtained and provided as feedback loop to the "Stand-alone HS-DPCCH policy configuration". For example, if the NodeB historical data indicates that 3 repetitions would typically be sufficient for some response, while anything above 3 would typically yield no response, the "Stand-alone HS-DPCCH policy configuration" policy can be adapted to limit transmission repetition to 3 instances since further repetition is likely pointless. That is, the historical data is indicative of an appropriate or likely useful number of retransmissions.

Resource usage in the uplink may be utilized within the context of forming policies for the NodeB. For example, if a maximum number of common E-DCH resources have all been consumed, then a new UE will not be granted any resources (even if it requests such resources). Therefore, there is no purpose in sending an HS-SCCH order for the UE to acquire the common E-DCH resource right away. When a UE acquires the common E-DCH resource and the "E-DCH transmission continuation back off" (25.331, 10.3.6.9a) is configured, the UE has to wait that long without any uplink or downlink traffic to release the common E-DCH channel. The number of common E-DCH resources is pre-allocated in a pool by the system. When the pool reaches a limit while all UEs are still retaining such resources with the back-off timer running, the decision of "Stand-alone HS-DPCCH policy configuration" could be either (1) do not transmit a new HS-SCCH order at this time (i.e., part of the output "others (wait info)"); or (2) force one of the lower-priority UEs to release the resources (i.e., part of the output "others(preemption info").

Referring to FIG. 4, in addition to the RepPeriod and MaxRepetition parameters discussed at length herein, various embodiments of the policy configuration manager 410 (or RNC) may provide additional parameters for policy configurations for NodeB triggering, such as wait information, pre-emption information and others (not shown).

Wait information parameters may be used to configure a NodeB to "hold" (i.e., do not transmit) or "wait" some amount of time before transmitting a HS-SCCH order to a UE or group/class of UEs. The wait parameter may further include a time parameter to indicate that the UE or group of UEs should be triggered after some period of time such that it functions as backoff timer with respect to transmitting HS-SCCH orders. These parameters find particular utility within the context of configuring NodeBs where the NodeB does not need to trigger (or should not trigger) a standalone HS-DPCCH, or where the NodeB should wait for some period of time to do so. The policy configuration manager or RNC may implement this type of configuration in NodeBs via any of several methods.

Pre-emption information may be used, illustratively, with a "hold" parameter in that, while a current UE is in a "hold" condition with respect to triggering, the NodeB may operate to release resources from another UE, such as a lower priority UE, a UE associated with criteria such as a waiting for traffic idle time exceeding a threshold value and the like. For example, for a UE associated with a threshold level proximate a backoff timer expiry, it might be useful to simply expire the timer and release the UE resources for use by, illustratively, the current UE.

In various embodiments, a pre-emption indicator may be implemented at the NodeB in accordance with pre-emption information received by the NodeB, illustratively a preemption algorithm received by or otherwise invoked at the NodeB. The pre-emption information may be sent to the NodeB by the RNC via the NBAP or FP as discussed herein with respect to other parameters and information. A pre-emption algorithm may also be invoked at the RNC. Generally speaking, whether invoked at either or both of the NodeB and RNC, a pre-emption algorithm facilitates pre-emption handling such as by indicating which operating conditions, parameters and the like may be pre-empted. In various embodiments, a hierarchy or parity level pre-emption algorithm may be provided in which, illustratively, if priority level-1 can pre-empt priority level-2, then a flow of traffic with pre-empt level-1 can receive a resource allocation associated with existing users that are level-2 or below (i.e., level-3, level 4, etc.). Thus, in various embodiments, a determination of a NodeB a parameter related to pre-emption may be used to identify priority levels of multiple UEs to selectively inhibit E-DCH transmission as needed.

With respect to power level, a NodeB can typically measure the total uplink interference, or the total downlink power currently used to defer the decision (i.e., "wait info" output) or have a more relaxed (i.e., longer) repetition period.

With respect to traffic level, if outstanding traffic for a particular {UE/logical channel} is low, then the number of repetitions can be less aggressive; whereas if the outstanding traffic is high, then there is a likelihood of quick feedback from the UE such that it may be economical and reasonable to simply wait for the UE feedback.

In various embodiments, the functions of the policy configuration manager 410 and other entities discussed herein with respect to the various figures are included within the RNC. In various embodiments, these functions are included within the NodeB. In various embodiments, these functions are distributed between the RNC and NodeB. In various embodiments, these functions are implemented via a separate network element, such as a standalone policy configuration manager or within the context of managing entity or element within the network.

In various embodiments, computational load sharing between the NodeB and RNC may be provided or adapted in response to the type of dynamic feedback information to be processed. That is, while dynamic feedback information may be passed from NodeB to the RNC or policy configuration manager, due to latency considerations it may be more practical to process dynamic feedback information at the NodeB. Thus, in various embodiments, the NodeB and RNC operate to provide complementary information with respect to determining policy parameters by locally processing respective dynamic information as appropriate.

For example, in various embodiments a "Stand-alone HS-DPCCH policy configuration" process may be invoked at the NodeB. In some of these embodiments, other attributes such as UE QoS, RACH Transmission Parameters for enhanced uplink and the like may be provided by the RNC to the NodeB for use in the policy configuration process.

Suggested Policy/Local Policy Override

Various embodiments allow the NodeB to interpret parameters such as RepPeriod and MaxRepetition as "suggested RepPeriod" and "suggested MaxRepetition." In this manner, the policy configuration invoked by the parameters may be replaced or overridden by the NodeB in response to specific information, network conditions, UE conditions and so on no and to the NodeB. As an example, in a single UE, low downlink power usage case, the NodeB can decide to be more aggressive with the RepPeriod. In other words, functionality associated with determining the "Stand-alone HS-DPCCH policy configuration" is a split between the RNC 20 and NodeB 30.

Additional Policy Parameters

Various embodiments provide that the RNC or other configuring entity may provide additional parameters along with the defined (or suggested) RepPeriod and MaxRepetition parameters. In this manner, the policy configuration invoked by the parameters may be more finely tuned or nuanced to enable more efficient NodeB operation, including additional flexibility with respect to NodeB override of initial/suggested parameters, NodeB utilization of some or all of any additional parameters, NodeB override of initial/suggested values of any additional parameters and so on.

Various embodiments help optimize the operation of "HS-DPCCH without ongoing E-DCH transmission" from the HS-SCCH code usage and interference reduction point of view. In addition, various embodiments provide a mechanism to differentiate policies configured at the NodeB as a function of QoS, UE experience, network congestion and so on.

Various embodiments advantageously provide one or more centralized points of NodeB configuration to provide thereby consistent policies for NodeB operation in various situations and in a manner less prone to error. Further, various embodiments provide flexibility in terms of policy differentiation, policy granularity and so on.

Thus, the various embodiments provide systems, methods, apparatus and mechanisms for configuring operations pertain to NodeB triggering of standalone HS-DPCCH (High Speed-Dedicated Physical Control Channel) without ongoing E-DCH (Enhanced Dedicated Channel) transmission within a Universal Mobile Telecommunications System (UMTS) system. Generally speaking, within the context of the various embodiments the following steps are performed one or more times by a radio network Controller (RNC) or other entity associated with a NodeB of interest: determining for the NodeB a first parameter (RepPeriod) value indicative of a time period within which the NodeB will repeatedly transmit toward a UE a HS-SCCH order adapted to trigger a standalone HS-DPCCH at the UE; determining for the NodeB a second parameter (MaxRepetition) value indicative of a number of times the HS-SCCH order will be transmitted to the UE before the NodeB initiates a downlink blind transmission when the UE has no uplink data to transmit; and transmitting toward the NodeB the determined first and second parameter values to adapt thereby the operation of the NodeB responsive to a standalone HS-DPCCH without ongoing E-DCH transmission.

The first and second parameter values may be determined using UE QoS attributes, Random Access Channel (RACH) parameters for enhanced uplink, system information and/or other information as discussed herein, such as traffic class, traffic handling priority, allocation priority, retention priority, UE power level, traffic level, local or system congestion level, downlink (DL) and/or uplink (UL) usage, code or channel usage and/or other resource usage.

The first and second parameter values may be determined using historical information such that the first and second parameter values are constrained to those historical values which are likely to be useful. Stated differently, those historical values likely to be pointless are avoided. The above-described "hold" and/or "wait" parameters may be used for this purpose.

Policy configurations for NodeB triggering may be strictly defined in terms of the first and second parameter values. Policy configurations for NodeB triggering may be flexible in that one or both of the first and second parameter values may be modified by a NodeB in response to local conditions or information related to the NodeB.

Policy configurations for NodeB triggering may be applied to different triggering classes such as different groups of UEs, different categories of traffic or any combination thereof. For example, UE groups may be defined in terms of any of service level agreements (SLA), service provider, UE device capability, type of mobile service, type of traffic, priority of traffic, priority of traffic channel, and Random Access Channel (RACH) parameters such as for enhanced uplink and/or other characteristics alone or in combination. Similarly, categories of traffic may be defined in terms of traffic type (e.g., streaming video, streaming audio or other mobile service), traffic source or operator, type of bearer or transfer channel used for traffic and/or other characteristics alone or in combination.

Policy configurations for NodeB triggering may be applied to an individual UE, a logical channel associated with an individual UE and so on.

Policy configurations for NodeB triggering may be applied to a single NodeB or many NodeBs. These policy configurations may be applied individually to each NodeB. These policy configurations may be applied in a centralized manner to enforce conformity of NodeB triggering across common triggering classes. The policy configurations may be applied in a priority order, in terms of UE priority, NodeB priority and/or other priority indicia such as defined using pre-emption information as discussed herein.

Broadly speaking, the various NodeB policy configurations discussed herein may be apply to one or more NodeBs individually or as a group, and further applied according to various triggering classes such as defined in terms of service level agreements (SLA), service provider, UE device capability, type of mobile service, type of traffic, priority of traffic, priority of traffic channel, and Random Access Channel (RACH) parameters for enhanced uplink and so on as discussed in more detail herein.

Figure 5:
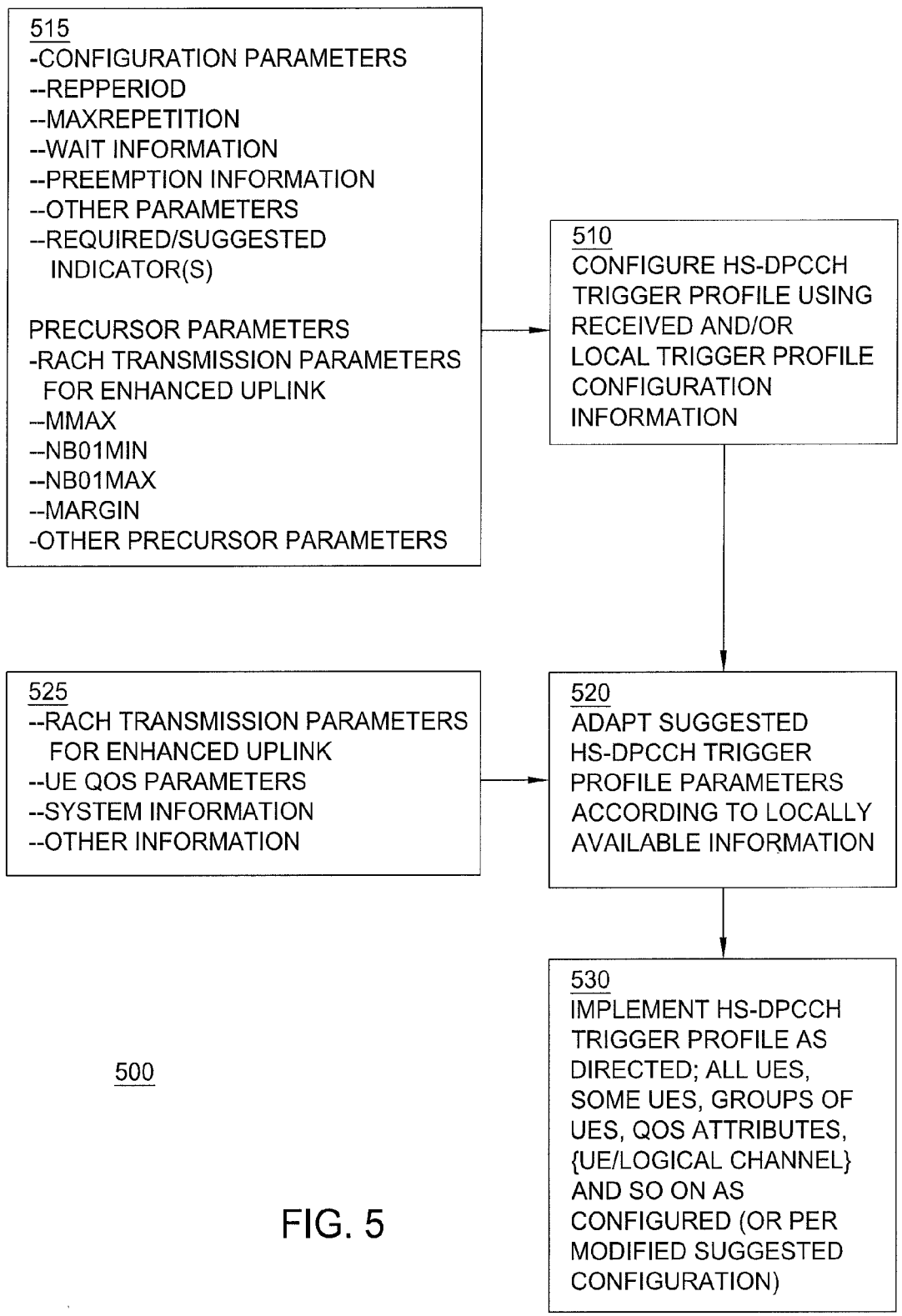
FIG. 5 depicts a flow diagram of methods according to various embodiments.

FIG. 5 depicts a flow diagram of a method according to one embodiment. Specifically, the method 500 of FIG. 5 provides a mechanism for NodeB operation, including NodeB operation as described above with respect to the various figures and embodiments.

At step 510, the NodeB configures a HS-DPCCH trigger profile using received and/or local trigger profile configuration information.

Referring to box 515, received configuration parameters may comprise predetermined values for parameters such as RepPeriod, MaxRepetition and the like, as well as trigger process modifiers defined by, illustratively, Wait Information, Pre-Emption Information and the like. It is noted that these and other parameters and parameter values may be iteratively processed by the various methodologies to achieve a further refinement of the parameter value, to provide a feedback mechanism useful in improving the methodology and/or its results and so on.

In various embodiments, a required/suggested indicator is provided for one or more of the parameter values and process modifiers. Required parameter values or process modifiers are used to configure the NodeB trigger policy without modification. Suggested parameter values or process modifiers are used to configure the NodeB trigger policy as well, though the NodeB may override or modify these parameter values or process modifiers if appropriate.

In various embodiments, precursor parameters such as RACH transmission parameters such as for enhanced uplink (e.g., Mmax, Nb01min, Nb01max, margin etc.) and/or other precursor parameters are provided to the NodeB such that the NodeB may itself determine some or all of the parameter values for the NodeB trigger policy. For example, as discussed above, a value for the parameter may be determined as RepPeriod=Mmax*Nb01max+margin; where Mmax is a maximum number of preamble cycles, Nb01max is an upper bound for random backoff when a NACK to AICH is received, and Margin is an amount of time associated with propagation delay and UE processing time. Other precursor values may be provided to calculate RepPeriod, MaxRepetition, HoldoffTime and/or other parameter values.

At step 520, any suggested trigger profile parameter values or process modifiers are adapted in response to any information known to the NodeB. Referring to box 525, such information may comprise RACH transmission parameters such as for enhanced uplink, UE QoS parameters, system information and other information. For example, in various embodiments, the RepPeriod is modified by NodeB using dynamic system info, dynamic hs-dpcch usage statistics and/or other information.

At step 530, the NodeB implements the HS-DPCCH trigger profile as directed and/or modified. The trigger profile may contemplate the same behavior for each UE service by the NodeB, some of the UE's, various groups of UE's, various UE's according to QOS attributes, EU/logical channel pairs and so on as discussed above with respect to the various embodiments.

The various embodiments and modifications thereto discussed above with respect to any of FIGS. 1-5 may be used to modify any of the other embodiments and modifications thereto discussed above with respect to any of the other figures.

Figure 6:
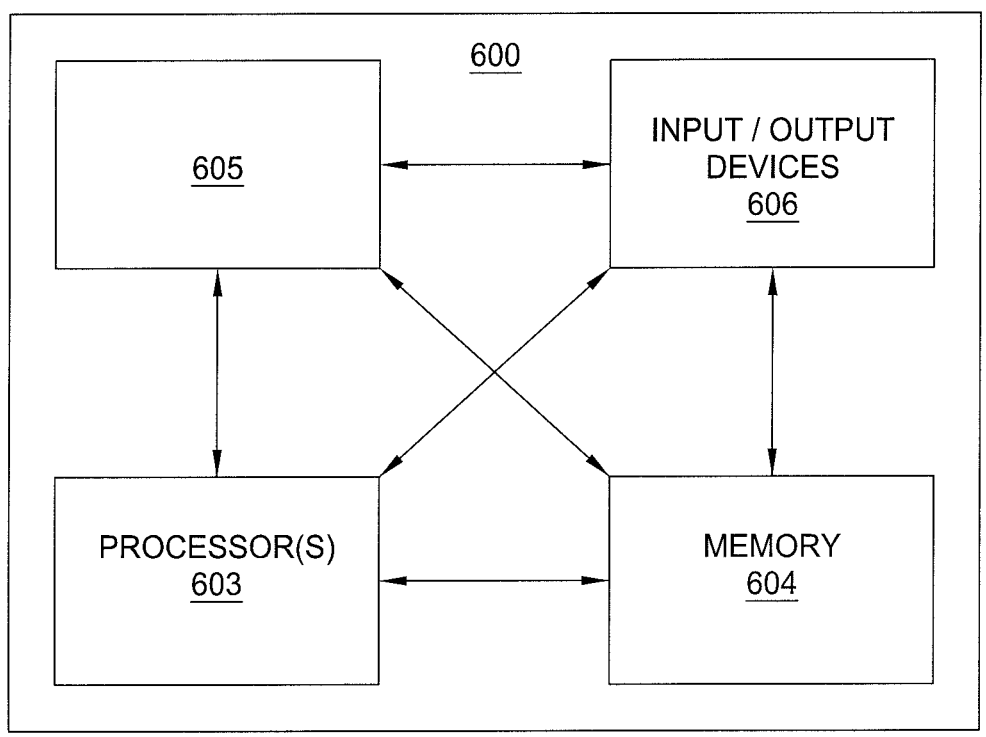
FIG. 6 depicts a high-level block diagram of a general purpose computer suitable for use in performing the functions described herein.

FIG. 6 depicts a high-level block diagram of a computing device, such as a processor in a telecom network element, suitable for use in performing functions described herein such as those associated with the various elements described herein with respect to the figures.

As depicted in FIG. 6, computing device 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and nontransitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for configuring a NodeB to trigger standalone HS-DPCCH (High Speed-Dedicated Physical Control Channel) without ongoing E-DCH (Enhanced Dedicated Channel) transmission within a Universal Mobile Telecommunications System (UMTS) system, the method comprising:
   determining for the NodeB a first parameter (RepPeriod) value indicative of a time period within which the NodeB will repeatedly transmit toward a UE a High Speed-Shared Control channel (HS-SCCH) order adapted to trigger a standalone HS-DPCCH at the UE; and
   determining for the NodeB a second parameter (MaxRepetition) value indicative of a number of times the HS-SCCH order will be transmitted to the UE before the NodeB initiates a downlink blind transmission when the UE has no uplink data to transmit; and
   using said first and second parameter values within a policy for said NodeB.

2. The method of claim 1, wherein said steps of determining said first and second parameter values are performed at a NodeB using information received from a radio network controller (RNC) associated with the NodeB.

3. The method of claim 2, wherein said information received from said RNC comprises any of RACH information and UE QoS information.

4. The method of claim 1, wherein said steps of determining said first and second parameter values are performed by a Radio Network Control (RNC) associated with the NodeB, said method further comprising transmitting toward the NodeB the determined first and second parameter values to adapt thereby the operation of the NodeB.

5. The method of claim 2, wherein information is received from said RNC via any of a NodeB application part (NBAP) control plane protocol and a HS-DSCH Frame Protocol.

6. The method of claim 1, wherein said first and second parameter values are determined using any of RACH information, UE QoS attributes or system information.

7. The method of claim 6, wherein said UE QoS attributes include any of traffic class, traffic handling priority, allocation priority, and retention priority.

8. The method of claim 6, wherein said system information comprises any of UE power level, traffic level, congestion level, DL/UL usage, code usage, resource usage and HS-SCCH order sending statistics.

9. The method of claim 2, wherein at least one of said first and second parameter values is determined by said RNC according to HS-SCCH order sending statistics provided by said NodeB and indicative of an appropriate number of retransmissions.

10. The method of claim 1, further comprising:
    determining for the NodeB a third parameter (wait) value indicative of a time period for the NodeB to wait before the HS-SCCH order will be transmitted to the UE.

11. The method of claim 1, further comprising:
    determining for the NodeB a parameter (pre-emption) adapted to identify priority levels of multiple UEs to selectively inhibit E-DCH transmission.

12. The method of claim 4, wherein said steps of determining and transmitting a pair of first and second parameter values are repeated for each of a plurality of UE groups associated with said NodeB to correspondingly configure NodeB operation.

13. The method of claim 12, wherein said UE groups are defined in terms of any of service level agreements (SLA), service provider, UE device capability, type of mobile service, type of traffic, priority of traffic, priority of traffic channel, and Random Access Channel (RACH) parameters.

14. The method of claim 4, wherein said steps of determining and transmitting a pair of first and second parameter values are repeated for each UE within a subset of UEs associated with said NodeB to correspondingly configure NodeB operation.

15. The method of claim 4, wherein said steps of determining and transmitting a pair of first and second parameter values are repeated for at least one logical channel used by each UE within said subset of UEs associated with said NodeB.

16. The method of claim 4, wherein said steps of determining and transmitting a pair of first and second parameter values are repeated for each {UE, LogicalChannel} pair within a subset of {UE, LogicalChannel} pairs associated with said NodeB to correspondingly configure NodeB operation.

17. The method of claim 4, wherein said pair of first and second parameter values transmitted towards the NodeB comprise suggested parameter values to correspondingly configure NodeB operation to adapt any of said first and second parameter values in response to information possessed by said NodeB.

18. The method of claim 4, wherein said steps of determining and transmitting a pair of first and second parameter values are repeated for each of a plurality of UE group types associated with said plurality of NodeBs to correspondingly configure common NodeB operation for each UE group type, wherein said UE group types are defined in terms of any of service level agreements (SLA), service provider, UE device capability, type of mobile service, type of traffic, priority of traffic, priority of traffic channel, and Random Access Channel (RACH) parameters.

19. The method of claim 1, wherein said first and second parameters are configured according to HS-DSCH priority queue information.

20. The method of claim 1, wherein said first parameter is estimated using the following equation:

$$RepPeriod = Mmax * Nb01max + margin$$

where:
Mmax is a maximum number of preamble cycles;
Nb01max is an upper bound for random backoff when a NACK to AICH is received; and
Margin is an amount of time associated with propagation delay and UE processing time.

21. A telecom network element for configuring a NodeB to trigger standalone HS-DPCCH (High Speed-Dedicated Physical Control Channel) without ongoing E-DCH (Enhanced Dedicated Channel) transmission within a Universal Mobile Telecommunications System (UMTS) system, comprising a processor configured for:
determining for the NodeB a first parameter (RepPeriod) value indicative of a time period within which the NodeB will repeatedly transmit toward a UE a High Speed-Shared Control channel (HS-SCCH) order adapted to trigger a standalone HS-DPCCH at the UE;
determining for the NodeB a second parameter (MaxRepetition) value indicative of a number of times the HS-SCCH order will be transmitted to the UE before the NodeB initiates a downlink blind transmission when the UE has no uplink data to transmit; and
transmitting toward the NodeB the determined first and second parameter values to adapt thereby the operation of the NodeB responsive to a standalone HS-DPCCH without ongoing E-DCH transmission.

22. The telecom network element of claim 21:
wherein said telecom network element comprises a Radio Network Controller (RNC) in communication with a plurality of NodeBs in said UMTS network; and
wherein said steps of determining and transmitting a pair of first and second parameter values are repeated for each of said plurality of NodeBs to configure standalone HS-DPCCH triggering at each NodeB according to UE class, traffic class, local dynamic network conditions, individual NodeB policy, common NodeB policy and network management policy.

23. A tangible and non-transient computer readable storage medium storing instructions which, when executed by a computer, adapt the operation of the computer to provide a method for configuring a NodeB to trigger standalone HS-DPCCH (High Speed-Dedicated Physical Control Channel) without ongoing E-DCH (Enhanced Dedicated Channel) transmission within a Universal Mobile Telecommunications System (UMTS) system, the method comprising:
determining for the NodeB a first parameter (RepPeriod) value indicative of a time period within which the NodeB will repeatedly transmit toward a UE a High Speed-Shared Control channel (HS-SCCH) order adapted to trigger a standalone HS-DPCCH at the UE;
determining for the NodeB a second parameter (MaxRepetition) value indicative of a number of times the HS-SCCH order will be transmitted to the UE before the NodeB initiates a downlink blind transmission when the UE has no uplink data to transmit; and
transmitting toward the NodeB the determined first and second parameter values to adapt thereby the operation of the NodeB responsive to a standalone HS-DPCCH without ongoing E-DCH transmission.

24. A computer program product embodied in a non-transitory computer readable storage medium storing computer instructions, wherein the computer instructions, when executed by a processor in a telecom network element, adapt the operation of the telecom network element to provide a method for configuring a NodeB to trigger standalone HS-DPCCH (High Speed-Dedicated Physical Control Channel) without ongoing E-DCH (Enhanced Dedicated Channel) transmission within a Universal Mobile Telecommunications System (UMTS) system, the method comprising:
determining for the NodeB a first parameter (RepPeriod) value indicative of a time period within which the NodeB will repeatedly transmit toward a UE a High Speed-Shared Control channel (HS-SCCH) order adapted to trigger a standalone HS-DPCCH at the UE;
determining for the NodeB a second parameter (MaxRepetition) value indicative of a number of times the HS-SCCH order will be transmitted to the UE before the NodeB initiates a downlink blind transmission when the UE has no uplink data to transmit; and
transmitting toward the NodeB the determined first and second parameter values to adapt thereby the operation of the NodeB responsive to a standalone HS-DPCCH without ongoing E-DCH transmission.

* * * * *